(12) United States Patent
Koch et al.

(10) Patent No.: US 11,179,863 B2
(45) Date of Patent: Nov. 23, 2021

(54) SLICER AND METHOD FOR ITS LAYOUT

(71) Applicant: MULTIVAC SEPP HAGGENMUELLER SE & CO. KG, Wolfertschwenden (DE)

(72) Inventors: Dominic Koch, Biedenkopf (DE); Manfred Achenbach, Biedenkopf (DE); Winfried Hoerberg, Oberguenzburg (DE)

(73) Assignee: MULTIVAC SEPP HAGGENMUELLER SE & CO. KG, Wolfertschwenden (DE)

(*) Notice: Subject to any disclaimer, the term of this patent is extended or adjusted under 35 U.S.C. 154(b) by 0 days.

(21) Appl. No.: 16/890,604

(22) Filed: Jun. 2, 2020

(65) Prior Publication Data
US 2020/0376702 A1 Dec. 3, 2020

(30) Foreign Application Priority Data
Jun. 3, 2019 (DE) .......................... 102019114845.6

(51) Int. Cl.
*B26D 7/27* (2006.01)
*A22C 17/00* (2006.01)

(52) U.S. Cl.
CPC .............. *B26D 7/27* (2013.01); *A22C 17/002* (2013.01); *B26D 2210/02* (2013.01); *Y10S 83/932* (2013.01)

(58) Field of Classification Search
CPC .............. Y10T 83/202; Y10T 83/6563; Y10T 83/6542; Y10T 83/6544; Y10T 83/6552; Y10T 83/6555; Y10T 83/95; Y10S 83/932; B26D 7/27; B26D 7/01; B26D 7/06; B26D 2210/00; B26D 2210/02; B26D 2007/011; A22C 17/002
See application file for complete search history.

(56) References Cited

U.S. PATENT DOCUMENTS

| 4,428,263 A | 1/1984 | Lindee et al. |
| 4,913,019 A | 4/1990 | Hayashi |
| 5,974,925 A | 11/1999 | Lindee et al. |
| 2003/0221528 A1 | 12/2003 | Sandberg et al. |

FOREIGN PATENT DOCUMENTS

| DE | 39 18 449 A1 | 2/1990 |
| DE | 39 26 588 C1 | 1/1991 |
| EP | 0 260 946 A2 | 3/1988 |
| WO | 99/08844 A1 | 2/1999 |

OTHER PUBLICATIONS

German Search Report dated May 6, 2020, Application No. 10 2019 114 845.6, Applicant MULTIVAC Sepp Haggenmueller SE & Co. KG, 7 Pages.

*Primary Examiner* — Phong H Nguyen
(74) *Attorney, Agent, or Firm* — Brooks Kushman P.C.

(57) ABSTRACT

In order to avoid a gap on both sides of a blade exit point, if an outer radius of a product caliber is smaller than an inner radius of a product opening in a cutting frame at this point, a contour of the cutting frame in this blade exit area is given a radius of curvature as small as the smallest product caliber to be expected.

20 Claims, 6 Drawing Sheets

SLICER AND METHOD FOR ITS LAYOUT

CROSS-REFERENCE TO RELATED APPLICATIONS

This application claims priority to German Patent Application No. DE 102019114845.6 filed on Jun. 3, 2019, the disclosure of which is incorporated in its entirety by reference herein.

TECHNICAL FIELD

The invention relates to so-called slicers, which are used in the food industry to slice strands of an only slightly compressible product such as sausage or cheese.

BACKGROUND

Since these strands can be produced with a cross-section that is well-shaped and dimensionally stable over their length, i.e. essentially constant, they are called product calibers.

Several product calibers are usually sliced simultaneously side by side by cutting a slice in one pass from the same blade, which moves in a transverse direction to the longitudinal direction of the product calibers.

The product calibers are pushed forward by a feed conveyor towards the blade, usually on a downward sloping feed conveyor, and are each guided through the product openings of a so-called cutting frame, at the front end of which the part of the product caliber projecting beyond it is cut off as a slice by the blade immediately in front of the cutting frame.

The slices usually fall onto a conveyor, by means of which they are transported away for further processing.

In order to achieve a good cutting pattern of the individual slices, the product caliber must fit as accurately as possible into the product openings of the cutting frames, at least in the circumferential area against which the blade presses the product caliber against the inner circumference of the product opening due to resistance during cutting, the so-called blade exit area.

This is the area of the peripheral contour of the product openings around the blade exit point. This is the last point of the cross-section of the product opening that the cutting edge of the blade passes over as it passes through the cross-section of the product opening before leaving this cross-section.

Although the product calibers have a constant cross-sectional contour, often a round cross-sectional contour, due to the manufacturing process, their size can vary slightly by about +/−5% between a maximum cross-sectional area FPmax and a minimum cross-sectional area FP min, and accordingly, in particular with a round cross-section between a maximum radius of curvature rPmax and a minimum radius of curvature rPmin, which the manufacturers of the slicers can assume when designing their product openings, the product openings have a size—which cannot be adjusted during operation—through which even the maximum cross-sectional area FPmax of a product caliber still fits without having to be deformed.

In this respect, there is the problem that with curved contours in the blade exit area of the outer circumference of the product caliber on the one hand and the inner circumference of the product opening on the other hand, when a product caliber which is small compared to the product opening is passed through, the latter is pressed against the blade exit point of the contour of the product opening, but because of the smaller radius of curvature of the contour of the product caliber compared to the contour of the product opening, there is a wedge-shaped gap at this point on both sides of the blade exit point into which material can be displaced during the cutting process, which can result in a not clean edge of the cut-off slice in this area, depending on the compressibility of the product as well as the gap size.

SUMMARY

It is therefore the task according to the invention to create a slicer and in particular a cutting frame which minimizes or completely eliminates this problem, as well as a method for designing such a cutting frame.

With regard to the slicer and in particular its cutting frames, it should first be clarified that the multiple product openings in a cutting frame often have the identical cross-section and/or, in the case of non-circular cross-sections, the identical rotational position, but the present invention is not limited to this.

Furthermore, it should be clarified that this problem does not arise if, in the blade exit area, both the contour of the product caliber and the contour of the product opening are straight and abut against each other, and/or if the blade exit direction at the blade exit point is perpendicular to this section of the contour, which, however, only concerns a minority of slicing situations.

The invention is designed to minimize, and in particular to avoid, the gap—when viewed perpendicular to the surface of the product opening—away from the blade exit point.

For this purpose, the inner contour of the product opening—in its axial course, particularly on the front surface of the cutting frames facing the blade—has a radius of curvature in the blade exit area which is ideally the same as the radius of curvature of the outer contour of the product cross-section therein, whereby "same size" means that it deviates from this by a maximum of +/−5%, better by a maximum of +/−3%, better by a maximum of +/−1%, ideally it does not deviate at all.

In the event of a deviation, the radius of curvature of the product opening in the blade exit area should preferably be smaller than the radius of curvature of the cross-section of the product caliber.

Therefore, the contour of the product opening in the blade exit area should have a radius of curvature that corresponds to the radius of curvature of the outer contour of the smallest possible expected or accepted product caliber that can occur as per the above definition of "same size". For this purpose, there is in particular an internally specified lower limit for this radius of curvature of the product caliber, which is usually determined as a function of the radius of curvature of the outer contour of the smallest possible product caliber in the blade exit area or corresponds to this.

Preferably, the contour of the product opening has no kink or heel, i.e. it is smooth and continuous.

In the case of a product opening intended for a round cross-section of a product caliber, its contour preferably has—in the blade exit area—a smaller radius of curvature than in the area opposite to the geometric centre of this contour. The transition areas between them can be straight lines or areas with a radius of curvature that changes continuously from the large to the small radius of curvature of the contour.

The large radius of curvature is preferably the radius of curvature that would be used for a product opening with a round cross-section for the corresponding batch of product calibers, i.e. usually a radius of curvature that is still slightly smaller than the radius of curvature of the outer contour of the cross-section of the largest possible emerging product caliber.

At the same time, of course, the area of the product opening should be equal to or larger than the area of the largest possible cross section of a product caliber that can emerge, so that the product caliber can be pushed through the cutting frames and their product opening without significant resistance.

Then the diameter of the product opening from the point of the largest to the point of the smallest radius of curvature of its inner contour is larger than the diameter of a round product opening as it would be used for cutting a varying batch of product calibers of round cross section.

The blade exit area is defined as a contour area from the contour (KS) of the cross-section of the product opening around its blade exit point.

Preferably, this contour area is defined as a segment starting from the geometric center of the contour, in which the center beam from the geometric center of the contour to the blade exit point is located.

The segment—looking at the blade side of the frames—is limited by a positive and a negative segment angle starting from the center beam, which do not have to be the same size. These two segment angles are each a maximum of 20°, better a maximum of 15°, and better a maximum of 10°.

The two segment angles are preferably equal if the exit direction of the blade at the blade exit point is perpendicular to the tangent at the exit point to the contour of the product opening.

Otherwise, the two segment angles are preferably not equal, but the segment angle is larger if the exit direction is different from the perpendicular to the tangent, or in other words, on the side of which the intermediate angle between the exit direction and the tangent to the blade exit point is smaller.

The blade exit direction is defined as the direction in which the point on the cutting edge located at the blade exit point continues to move from the blade exit point as the blade moves forward. In the case of a rotating blade, where the blade axis also moves during cutting, the direction of movement of the blade axis is not taken into account.

Preferably, the larger segment angle is then greater than the smaller segment angle by the difference between the larger and the smaller intermediate angle, whereby this difference angle can also be multiplied by a predetermined factor, preferably less than 1.0, preferably between 0.5 and 1.0, before application to the segment angles.

With regard to the process for designing the cutting frames, in particular the contour of their at least two product openings, in the initial situation described above the existing task is solved by selecting the radius of curvature of the inner contour of the product openings of the cutting frames in a blade exit area of the inner contour, that it is equal to the radius of curvature of the product contour of the smallest possible product caliber in the blade exit area, whereby "equal" means that it deviates from this by a maximum of +/−5%, better only +/−3%, better only +/−1%, percent.

For this purpose, there is in particular an internally specified lower limit for this radius of curvature of the product caliber, which is usually determined as a function of the radius of curvature of the outer contour of the smallest possible product caliber in the blade exit area or corresponds to this.

The blade exit area around the blade exit point is selected.

Preferably, a design of the cutting frames is chosen according to the above description of the slicer according to the invention, especially the cutting frames according to the invention.

BRIEF DESCRIPTION OF THE DRAWINGS

Types of exemplary embodiments according to the invention are described in more detail below as examples, with reference to the following drawings which show.

DETAILED DESCRIPTION

Figure 1A:
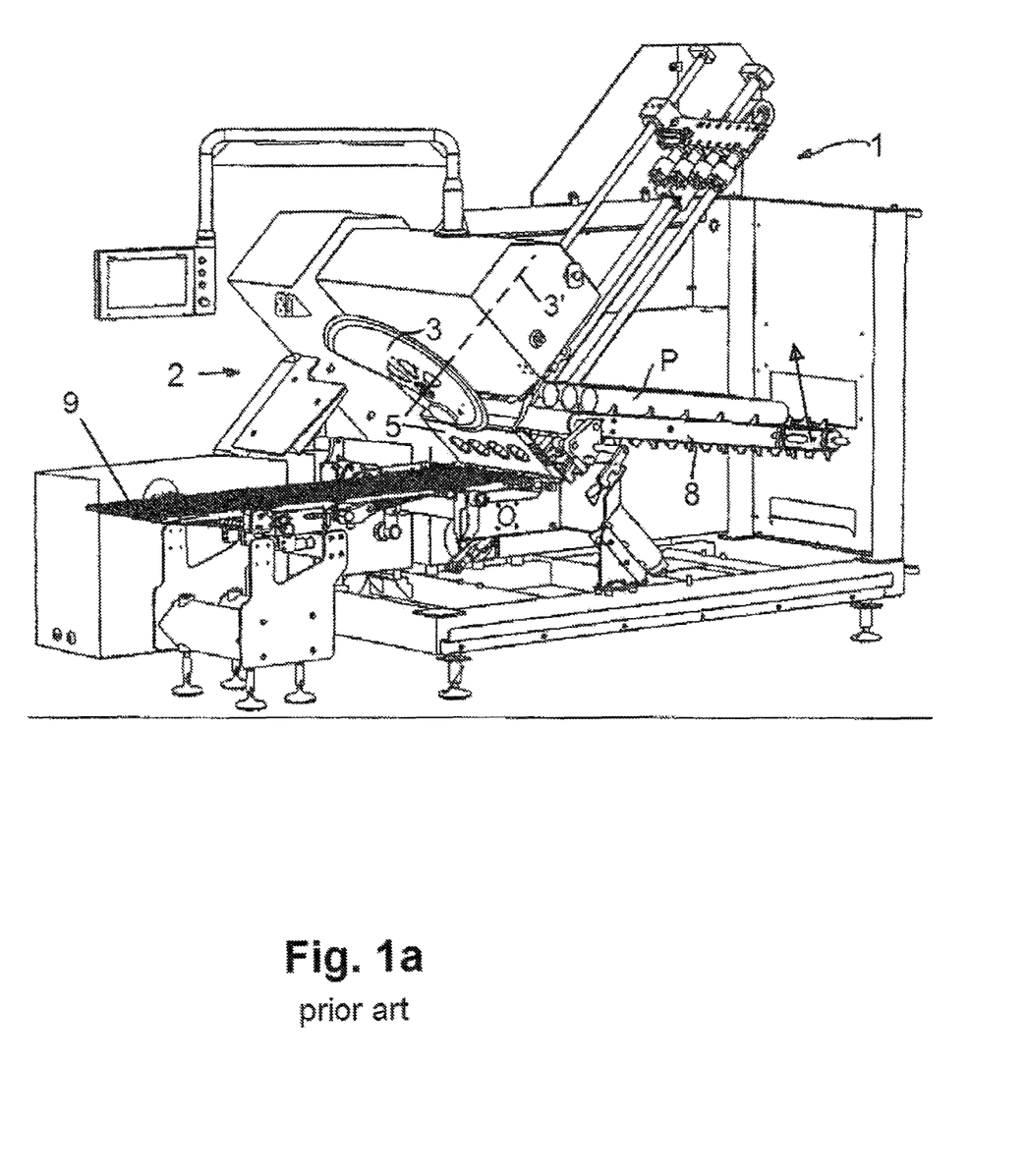
FIG. 1a: an embodiment of a generic slicer in perspective view.
Figure 1B:
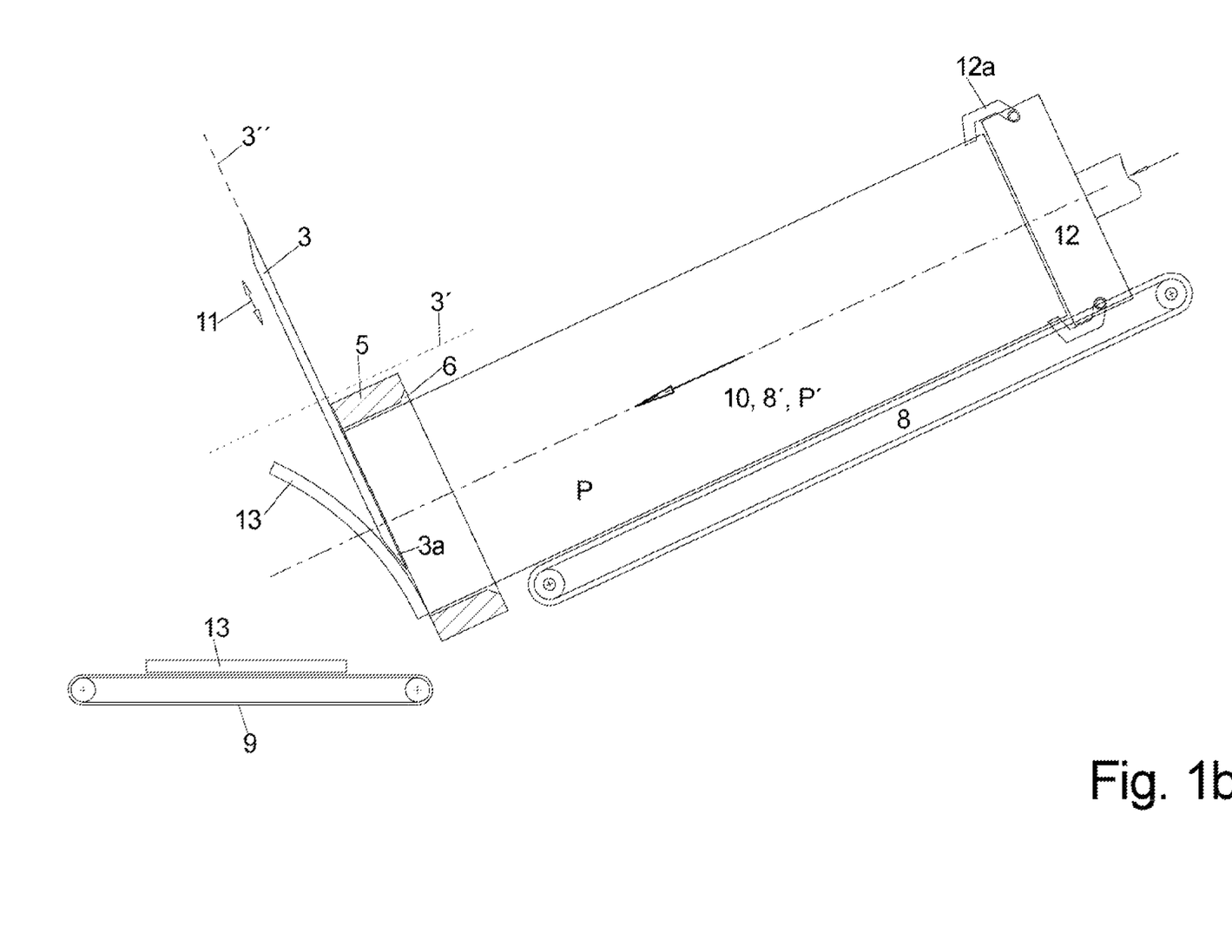
FIG. 1b: a longitudinal section through a product caliber during slicing.

FIG. 1a shows a common slicer 1, in which during slicing in this case four product calibers P are simultaneously pushed diagonally downwards through the corresponding four product openings of a cutting frame 5 in a controlled manner, and the protrusion of product caliber P in front of the front surface of the cutting frame 5 is cut off as a slice 13 from a common blade 3 rotating in a cutting plane 3" immediately in front of the front surface of the cutting frame 5, as more clearly visible in the longitudinal section laid along the longitudinal direction 10 of the slicer 1 by a product caliber P as shown in FIG. 1b.

The product calibers P are pushed forward in the feed direction 8' by means of a feed conveyor 8, on which they rest, by means of a longitudinal pusher 12, which rests against the rear end face of the product caliber P. This pusher not only pushes the rear end of the product caliber P forward, but also holds it in place by means of activatable and deactivatable gripping claws 12a, in order to prevent uncontrolled forward movement.

As FIG. 1a shows, the feeder 8 can be folded down horizontally for easier loading of new product calibers P and is folded up to the required activated inclined position for cutting.

In this activated inclined position, the rear ends of the new product caliber P are located in front of the sliding longitudinal slides 12 and can be contacted and gripped by them.

The feed direction 8' of the feeder 8 as well as the main extension direction P' of the product calibers P lying thereon then coincide with the longitudinal direction 10, the direction of movement of the longitudinal slides 12, which is generally perpendicular to the cutting plane 3" and corresponds in particular to the axial direction 10 of the product openings 6, 7 in the cutting gouge 5.

For this purpose, blade 3 has a cutting edge 3a which, in the plane 3" of the blade, has an increasing distance from the axis of rotation 3' of blade 3 in the circumferential direction around the axis of rotation 3', but does not extend over the full circumference. As a result, the cutting edge 3a plunges into the area of the cross-sections of the product openings again with each rotation of the blade 3, completely sweeps over all existing product openings with one rotation of the blade 3 and separates the protrusion of the product caliber P projecting beyond the blade plane 3″ as slices 13 which fall onto a removal conveyor 9, as shown in FIG. 1b.

Figure 2:
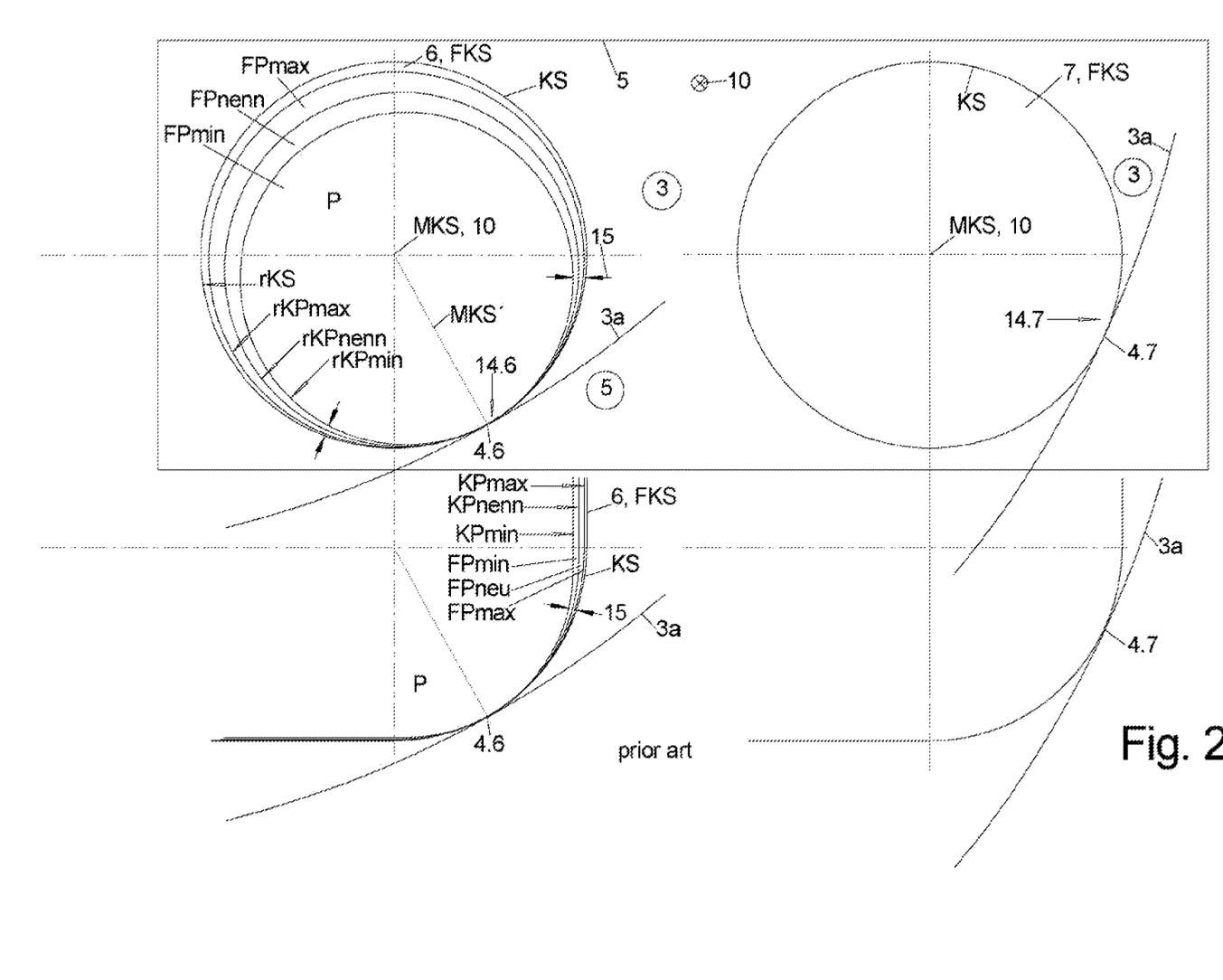
FIG. 2: the problem of different sized product calibers in the product opening of a cutting frame.

FIG. 2 shows—with a view in longitudinal direction 10 to the product openings 6, 7 of a cutting frame 5, which in this case is to have only these two product openings 6, 7, without limiting the invention thereon—the blade 3 in the position during cutting at each of the two product openings—which of course takes place one after the other in time—in which the blade 3 in this case coming from the top left with its cutting edge 3a covers the area FKS of the respective product openings 6, 7 and the overlap of the blade 3 with the front surface FKS of the respective product opening 6, 7 only in one blade exit point 4.6, 4.7 exists—viewed two-dimensionally according to FIG. 2.

It can also be seen in FIG. 2 that the blade exit point 4.6 and 4.7 at the two product openings 6, 7 is not at the same point of their circumference, depending on the shape of the blade 3, its path of movement and the position of the blade axis 3′.

In FIG. 2, the problem underlying the invention can be seen in the above shown cutting frames 5 with two circular, identically sized and identically formed product openings 6, 7 at the product opening 6.

The product calibers P to be cut open can have slightly different cross-sectional sizes due to the production process and thus cross-sectional areas from FP min to FPmax deviating from the nominal cross-sectional area FPnenn, i.e. in the case of a round cross-section as shown in FIG. 2 top left, their cross-sectional contours can have different radii of curvature rKP, i.e. deviating from the nominal radius of curvature rKPnenn between a larger, maximum radius of curvature rKPmax and a smaller, minimum radius of curvature rKPmin.

The values FPmax corresponding to rKPmax and FPmin corresponding to rKPmin are given to the developer of the slicer 1 and thus also to the designer of the product openings 6, 7 as limit values by the manufacturer of the product caliber P, and must all fit through the product opening 6, 7. For this reason, their size, i.e. the area FKS, is chosen to be at least equal to, usually somewhat larger than, the maximum cross-sectional area FPmax of a product caliber that can be handled, and accordingly the radius of curvature rKS of the usually identical product openings 6, 7 in the cutting frame 5 is equal to or larger than the radius of curvature rKPmin rKPmax of a product caliber with the maximum cross-sectional area FPmax that can be handled.

Figure 3:
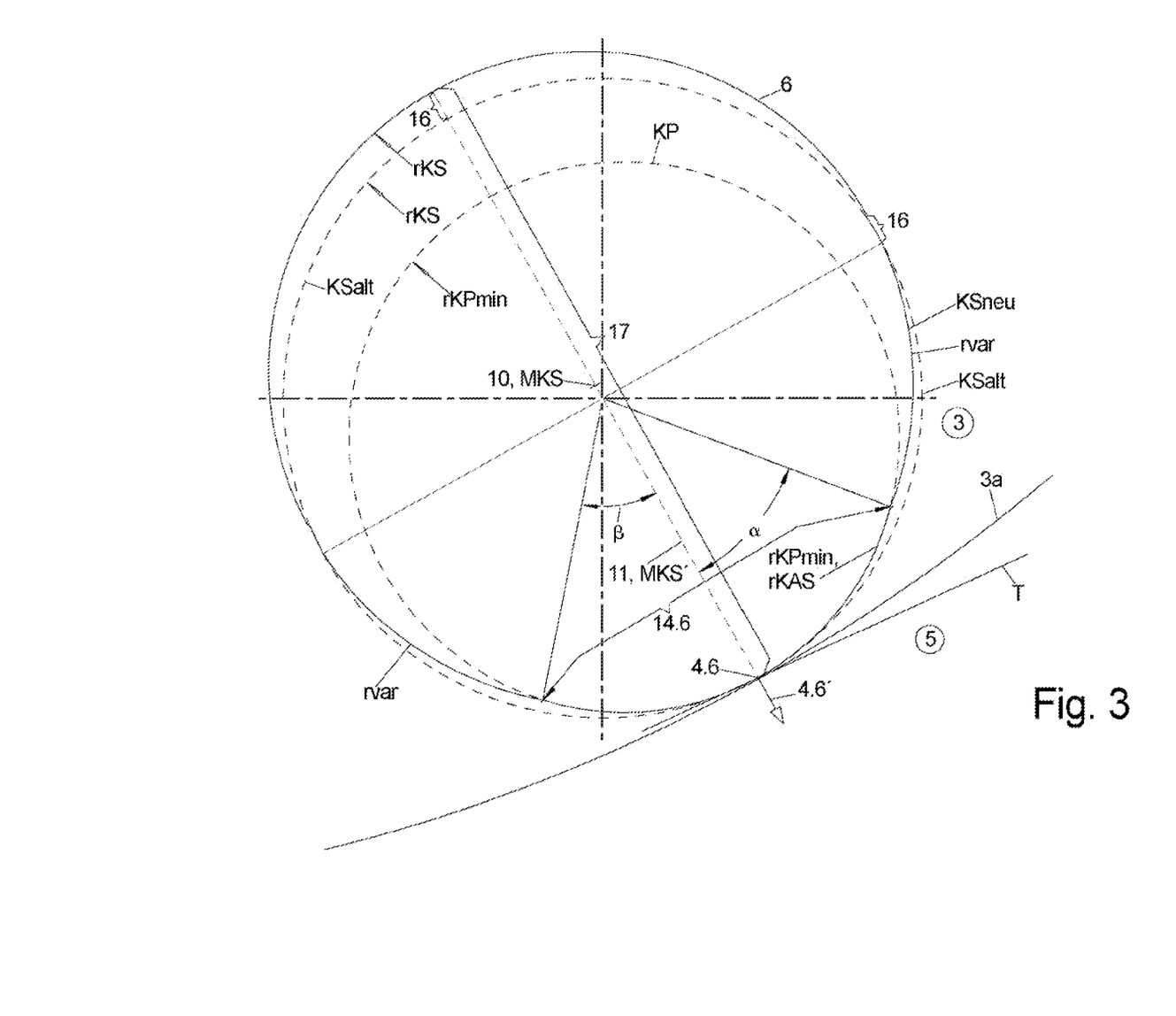
FIG. 3: a first invention-based embodiment of a product opening.
Figure 4:
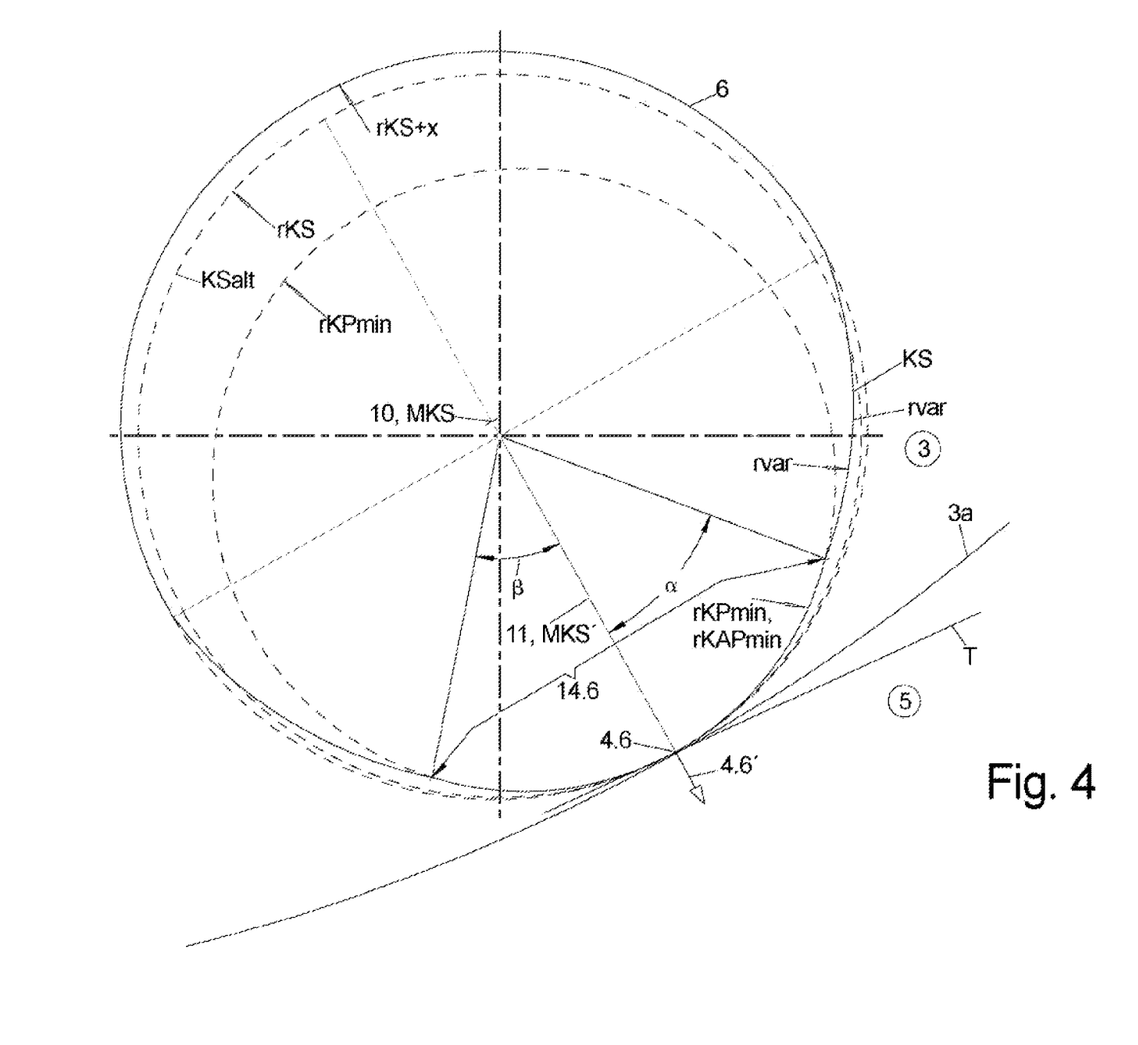
FIG. 4: a second embodiment of a product opening according to the invention, with the same blade exit direction as in FIG. 3, FIG. 5: a third embodiment of a product opening similar to FIG. 3, but with a different blade exit direction.
Figure 5:
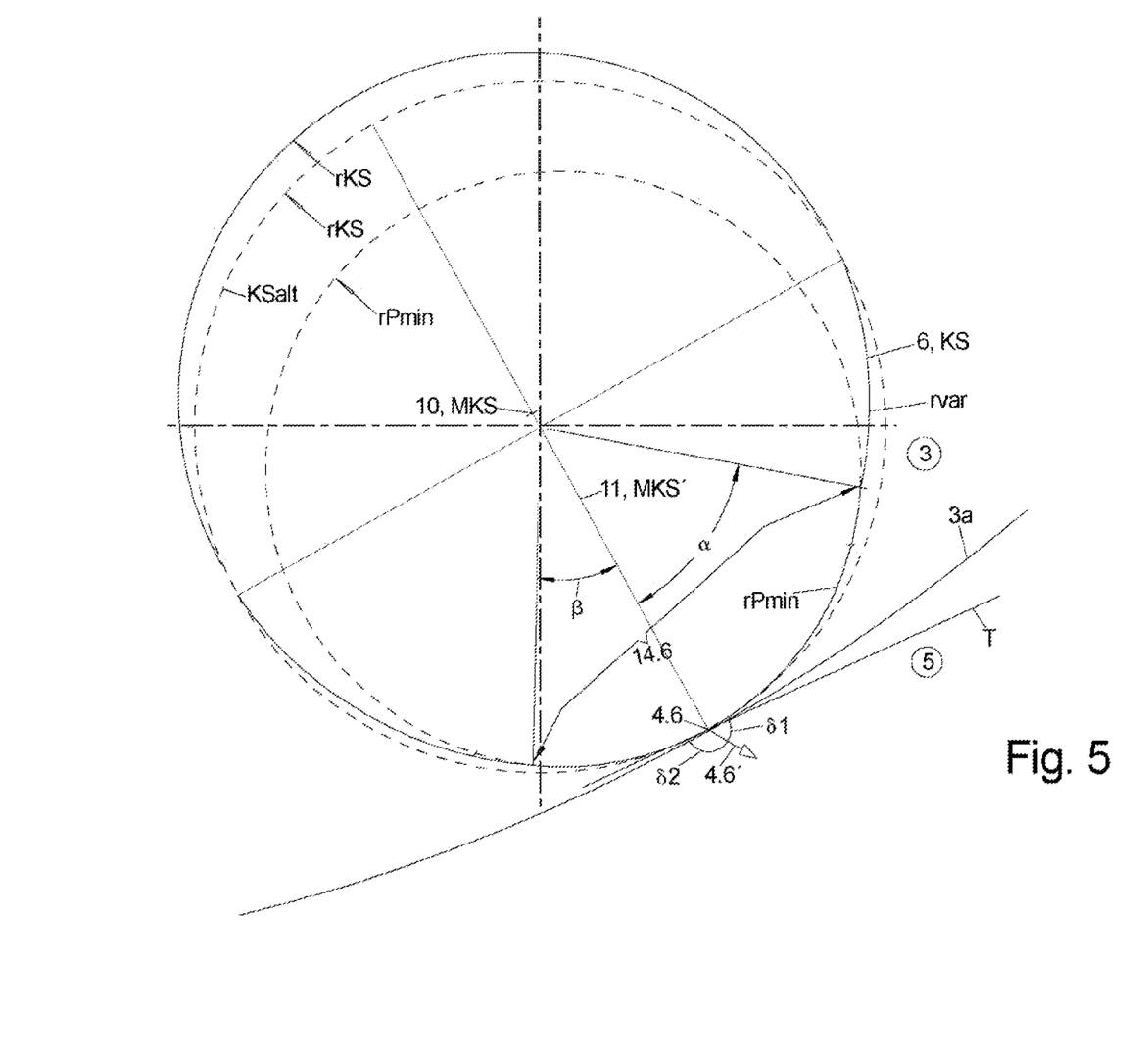

For despite the different cross-sectional areas of the product calibers, their cross-sectional contour is always qualitatively the same, in FIG. 2 above a circle. As shown in FIG. 2, the cross section of the product caliber P to be cut is pressed against the area of the contour KS of the product opening, which is the last area covered by the cutting edge 3a of blade 3, the so-called blade exit area 14.6, 14.7, as shown in FIGS. 3-5.

It can be seen that on both sides of the blade exit point 14.6, between the outer circumference of the product caliber P, i.e. the product contour KP, and the inner circumference of the product opening 6, i.e. the contour KS in the cutting frames 5, a wedge-shaped gap 15 opens up in the direction of view shown in FIG. 2, which extends from the blade exit point 4.6 in the circumferential direction, and the smaller the radius of curvature rKP of the contour of the product caliber P currently in the product opening 6, the faster this gap becomes.

As mass of the product caliber P can be shifted into this gap 15 when a slice 13 is cut off due to the cutting force exerted by the blade 3, this can lead to an unclean cut edge on the cut-off slice 13, so that such a gap 15—at least in the vicinity of the blade exit point 4.6, i.e. in a blade exit area 14.6 to be defined and extending around this point—should be avoided.

In FIG. 2, the same situation is shown below for a rectangular cross-section of a product caliber P and a corresponding product opening 6 enlarged at only one of its rounded corners.

It becomes clear that in the non-straight, curved area of the contour KS of the product opening 6 near the blade exit point 4.6, the same problem occurs in principle, but to a much lesser extent, since the gap 15 is also much smaller due to the much smaller radii of curvature of a rounded corner of a rectangular cross-section compared to a round cross-sectional contour KP of a product caliber P.

For this reason, the invention will be described below using FIGS. 3 to 5 only on a round cross-section of product caliber P and product opening 6, although this solution can be applied in the same way to the rounded corner area of rectangular cross-sections.

In FIG. 3, it is assumed that the blade exit direction 4.6′ is the perpendicular to the tangent T to contour KS of the product opening 6, which is redesigned according to the invention, in the blade exit point 4.6, i.e. the extension of the center beam MKS' starting from the geometric center, alternatively the center of gravity, MKS of the contour KS to the blade exit point 4.6 and beyond.

In accordance with the invention, the new contour KS of the product opening 6 now has a radius of curvature rKAS in the exit area 14.6 in a blade exit area 14.6, which as a segment to the left and right of the blade exit point 4.6 extends counter-clockwise by a positive segment angle α and clockwise by a negative segment angle β, which corresponds to the radius of curvature rKPmin of the smallest possible product caliber P. The segment angles α, β are preferably smaller than 20°.

The area of the contour KS opposite the blade exit area 14.6 with respect to the centre MKS still has the radius of curvature rKS of the old, round contour KSalt, which is equal to or smaller than the radius of curvature rKPmax of the contour of the largest possible product caliber P, but shifted further away from the blade exit point 4.6 by an offset 16.

The diameter 17 from the blade exit point 4.6 through the centre MKS to the opposite area of the contour KS of the product opening 6 is thus larger by the offset 16 than the diameter of a round cross-section whose area corresponds to the previous contour KSalt of the previous product opening, i.e. equal to or larger than the diameter of a product caliber P with the maximum area FPmax. In particular, the blade exit point 4.6 of the new contour KS of the product opening 6 is identical to that of the old contour KSalt.

This also results in a cross-sectional area FKS of the new product opening 6 which is equal to or larger than the cross-sectional area FPmax of the largest possible product caliber P.

This opposite area can preferably be a segment of 180°, but can also be a larger or smaller circumferential area.

The ends of the circumferential contour in the blade exit area 14.6 are connected—preferably without a kink or shoulder—to the opposite area of the circumferential contour with the previous radius of curvature rKS in each case by a transition area of the new contour KS, which in its course from the blade exit area 14.6 has a decreasing radius of curvature rvar.

However, between this transition area and one of the two adjacent areas, in particular the circumferential area with the previous radius of curvature rKS, the circumferential contour can also have a short straight section, for example with the length of offset 16.

In FIG. 5, which has been modified compared to FIG. 3, the two segment angles α and β are not equal in terms of amount, so that the MKS' mid-point beam is not located in the middle of the segment that limits the blade exit area 14.6.

The reason is that the blade exit direction 4.6' is different from the direction of the central beam MKS' and includes two different intermediate angles δ1 and δ2 compared to the tangent T. The product caliber P is therefore not pressed radially against the contour KS in the cutting frames 5, in particular against the blade exit point 4.6', in transverse direction 11 to the longitudinal direction 10, but at an angle to it.

Therefore, preferably the segment angle α, which points from the midpoint beam MKS' towards the smaller intermediate angle δ1, should be larger and the other segment angle β smaller.

This is preferably done depending on the difference between the two intermediate angles δ1 and δ2 or depending on one of these two intermediate angles, e.g. δ1, alone, for example by the difference between the two intermediate angles δ1 and δ2, corrected by a factor k if necessary, resulting in the angle amount by which the amount of the segment angle α in the direction of the smaller intermediate angle δ1 is now larger than the other segment angle β.

In FIG. 4, which again assumes a blade exit direction 4.6' perpendicular to the tangent T to the blade exit point 4.6 as in FIG. 3, the blade exit area 14.6 has the same segment size and radius of curvature as in FIG. 3.

However, so that the contour KS according to the invention again encloses the necessary area corresponding to the previous circular old contour KSalt and in particular an area equal to or larger than the area FPmax of the largest product caliber P to be processed, the radius of curvature rKS+x of the contour KS in the area opposite the blade exit area 14.6 is larger than in FIG. 3, i.e. larger than the radius of curvature rKPmax of the largest product caliber P to be processed.

The offset 16 described in FIG. 3 is therefore generally not additionally necessary to fulfill the surface condition described in the previous sentence.

LIST OF REFERENCE SIGNS

1 Slicer
2 Cutting unit
3 Blade
3a Cutting edge
3" Cutting plane, blade plane
4.6, 4.7 Blade exit point
4.6', 4.7" Blade exit direction
5 Cutting frames
6 Product opening
7 Product opening
8 Feed conveyor
8' Feed direction
9 Removal conveyor
10 Longitudinal direction, axial direction
11 Cross direction
12 Longitudinal slide
12a Gripper claw
13 Slice
14.6, 14.7 Blade exit area
15 Gap
16 Offset
FP surface area of product caliber
FPmax maximum surface area product caliber
FP minimum surface area product cCaliber
KP1, KP2 Product contour
KS Contour in cutting frames (product opening))
KSalt Contour in cutting frames (product opening) according to StdT
FKS Surface area in cutting frames (product opening)
FMD Geometrical center
MKS' Center Beam
P Product cCaliberer
rKS Radius of curvature in cutting frames (product opening)
rKS+x enlarged radius of curvature
rKAS radius of curvature in cutting frames (product opening) in the outlet area
rvar variable radius of curvature product opening
P, P1, P2 Product caliber
rKP radius of curvature Contour Product caliber
rKPmax Maximum radius of curvature Contour of Product caliber
rKPmin Minimum radius of curvature Contour of Product caliber
rKAP radius of curvature contour of product caliber in the outlet area
rKAP min radius of curvature contour of the smallest product caliber caliber in the outlet area
α positive segment angle
β negative segment angle
δ1 smaller intermediate angle
δ2 larger intermediate angle

The invention claimed is:

1. A slicer for slicing at least two product calibers simultaneously into slices, wherein the product calibers can have a qualitatively identical product contour, surfaces of which, as well as radii of curvature thereof in non-straight regions, vary between a minimum value and a maximum value, the slicer comprising:
a cutting frame with at least two product openings, whose inner contours lying perpendicular to an axial direction have a radius of curvature at least in some areas,
a cutting unit with a blade, which is movable in a transverse direction to the axial direction directly in front of the cutting frame for cutting off slices of the product calibers,
wherein the blade, viewed in the axial direction, is configured to leave the contours of the front product openings on a blade side, in each case at a blade exit point,
wherein the inner contour of each of the product openings of the cutting frame at least in a blade exit area of the inner contour has a radius of curvature which deviates from a radius of curvature of a product contour of a smallest product caliber of the product calibers or of a specified radius of curvature lower limit in the blade exit area by a difference of at most +/−5%,
wherein the blade exit point for each of the product openings lies in the respective blade exit area,
wherein the radius of curvature of the blade exit area of each of the product openings is smaller than the radius of curvature of the product contour of the smallest product caliber or the specified radius of curvature lower limit in the blade exit area, and wherein an area of each of the product openings corresponds at least to an area of a product caliber, of the product calibers, with a maximum large cross-sectional area.

2. The slicer according to claim 1, wherein the difference is not more than 3.0%.

3. The slicer according to claim 1, wherein
a contour region of one of the product openings is defined as the blade exit area from the contour of the cutting frame around the blade exit point in the form of a segment around a centre beam from a geometric centre of an area of the product opening to the blade exit point.

4. The slicer according to claim 3, wherein
the segment is bounded by a positive segment angle and a negative segment angle starting from the centre beam, both of which are a maximum of 20°, when looking in a direction of an exit side of the cutting frame.

5. The slicer according to claim 4, wherein
in the case of a blade exit direction of the blade at the blade exit point which is not perpendicular to a tangent to the contour of the one product opening at the blade exit point, the segment angle in a direction in which the exit direction assumes a smaller intermediate angle to the tangent, compared to an opposite larger intermediate angle to the tangent, is greater than the other segment angle.

6. The slicer according to claim 5 wherein the greater segment angle is larger than the other segment angle by a difference between the larger intermediate angle and the smaller intermediate angle, multiplied by a factor k, wherein the factor k is between 0.5 and 1.0.

7. The slicer according to claim 4 wherein the positive segment angle and the negative segment angle are each a maximum of 15°.

8. The slicer according to claim 4 wherein the positive segment angle and the negative segment angle are each a maximum of 10°.

9. The slicer according to claim 1, wherein
the contour of one of the product openings is pear-shaped having a first contour area with the minimum radius of curvature of the product caliber in the blade exit region and a second opposite contour area with the maximum radius of curvature of the product caliber.

10. The slicer according to claim 9, wherein the first and second contour areas are connected by straight lines, or between the first and second contour areas the radius of curvature changes continuously from the minimum radius of curvature to the maximum radius of curvature.

11. The slicer according to claim 1, wherein
the contour of one of the product openings away from the blade exit area has a radius of curvature at most corresponding to a radius of the product caliber with the maximum large cross-sectional area or a specified upper limit in a corresponding peripheral region.

12. The slicer according to claim 11, wherein the radius of curvature of the contour of the one product opening is at most 5% smaller than the radius of the product caliber with the largest possible cross-sectional area or the internally specified upper limit.

13. The slicer according to claim 11, wherein the radius of curvature of the contour of the one product opening is at most 3% smaller than the radius of the product caliber with the maximum large cross-sectional area or the specified upper limit.

14. The slicer according to claim 1, wherein the difference is not more than 2.0%.

15. The slicer according to claim 1, wherein the difference is not more than 1.0%.

16. The slicer according to claim 1, wherein the area of each of the product openings is larger than the area of the product caliber with the maximum large cross-sectional area.

17. The slicer according to claim 1 wherein, for each of the product openings, the area is opposite the respective blade exit area, and is shifted away from the respective blade exit point by an offset.

18. A method for slicing at least two product calibers simultaneously into slices with a slicer including a cutting frame with product openings, wherein the product calibers are able to have a qualitatively identical product contour, surfaces of which, as well as radii of curvature thereof, may vary in non-straight regions of the product contour between a minimum value and a maximum value, the method comprising slicing the product calibers with a blade of the slicer, wherein
a radius of curvature of an inner contour of each of the product openings of the cutting frame in a blade exit area of the inner contour is selected in such a way that it deviates by a difference of at most +/−5% from a radius of curvature of a product contour of a smallest product caliber of the product calibers or a specified radius of curvature lower limit in the blade exit area,
the radius of curvature of the blade exit area of each of the product openings is smaller than the radius of curvature of the product contour of the smallest product caliber or the specified radius of curvature lower limit in the blade exit area, and
an area of each of the product openings corresponds at least to an area of a product caliber, of the product calibers, with a maximum large cross-sectional area.

19. The method according to claim 18, wherein
the blade exit area is chosen around the blade exit point.

20. The method of claim 18, wherein the area of each of the product openings is larger than the area of the product caliber with the maximum large cross-sectional area.

* * * * *